United States Patent Office 3,763,062
Patented Oct. 2, 1973

3,763,062
NON-CRATERING FUSIBLE POLYESTER-CELLU-
LOSE ESTER COATING COMPOSITION
James D. Hood, Blountville, and James G. Stranch, Kingsport, Tenn., assignors to Eastman Kodak Company, Rochester, N.Y.
No Drawing. Continuation-in-part of application Ser. No. 50,928, June 29, 1970, now Patent No. 3,654,198. This application Jan. 4, 1972, Ser. No. 215,404
The portion of the term of the patent subsequent to Apr. 4, 1989, has been disclaimed
Int. Cl. C08b 21/08; C03c 17/28; C08g 51/36
U.S. Cl. 260—16
9 Claims

ABSTRACT OF THE DISCLOSURE

A polyester coating composition including a linear polyester, such as poly(1,4-cyclohexanedimethylene-40 mole percent terephthalate-60 mole percent isophthalate), cellulose acetate butyrate, a plasticizer, and optionally a stabilizer and/or pigment. The coating can be applied to a heatable substrate in powder form and caused to fuse by application of heat to produce a smooth, non-cratered surface.

---

This application is a continuation-in-part of copending application Ser. No. 50,928, filed June 29, 1970, by James D. Hood and James G. Stranch, now U.S. Pat. No. 3,654,198.

This invention relates to polyester coating compositions and more particularly to polyester coating compositions which can be deposited in finely divided or powdered form on heatable substrates and thereafter coalesced to form smooth, strongly adherent, continuous and uncratered coatings on such substrates.

As is known to those skilled in the art, the coating of a wide variety of articles of commerce such as refrigerators, washing machines, kitchen utensils, steel plates, wall panels and the like has been accomplished by brushing or spraying the surface of such articles with a solution of the coating material followed by evaporation of the solvent component. Over the years other coating techniques have been developed, one of which is to deposit the coating material on the surface of the article in the form of a heat-fusible powder which may contain, in addition to the primary protective material, any desired additives such as plasticizers, pigments and the like, after which the material is fused into a continuous coating under the influence of heat. Heat-fusible polyesters are useful as the coating or protective component of such powders but they have been found to be unsuitable in many applications because of a tendency to form "cratered" and therefore uneven coatings of undesirable appearance. As will be more fully set forth hereinafter, according to the present invention, heat-fusible polyesters applied by the powder-coating and fusion technique can be employed to produce smooth, uncratered, fused coatings on a wide variety of heatable substrates.

Accordingly, an object of this invention is to provide an improved type of heat-fusible polyester coating composition which can be applied to metal, glass, ceramic, thermosetting plastic and other heatable substrates to produce thereon smooth, uncrated, protective coatings.

A further object is to provide heat-fusible polyester coating compositions in the form of finely divided powders which can be deposited on metal, glass, ceramic, thermosetting plastic and other heatable substrates by standard powder deposition methods and then fused by application of heat to form smooth, strongly adherent and uncratered surface coatings.

A still further object is to provide heat-fusible polyester coating compositions of the type referred to in the preceding paragraph which are fusible into smooth, continuous, strongly adherent and uncratered surface coatings at temperatures normally employed in powder deposition and fusion processes.

Another object is to provide heat-fusible polyester coating compositions of the type referred to above which, after deposition on the surface of a heatable substrate and fusion thereon, will give coatings characterized by high adherence to the substrate, toughness, flexibility, impact strength, and resistance to the lowering of adherence by the action of water when the coated substrates are in contact with water.

Another object is to provide heat-fusible polyester coating compositions stabilized against adverse color changes when such powdered compositions are subjected to the fusion temperatures normally employed in powder deposition and fusion processes.

Other objects will appear hereinafter.

These objects are accomplished according to the invention by depositing on a heatable substrate a powdered polyester composition which can be fused into a smooth, continuous, uncratered coating by application of heat. As will be more fully set forth hereinafter and illustrated by the examples which follow, such compositions are based on a multi-component system, the principal component of which is a linear polyester, the preparation, composition and characteristics of which are known in the literature and set forth in references such as U.S. Pat. No. 2,901,466, the disclosure of which is incorporated herein by reference.

According to one aspect of our invention, there is provided a heat-fusible powdered composition comprising components (A), (B) and (C) as follows:

(A) from about 72 to about 98 parts by weight, based on the weight of the composition, of a linear polyester having an inherent viscosity of at least about 0.4 derived from
  (1) a dicarboxylic acid comprising 0–55 mole percent terephthalic acid and 100–40 mole percent isophthalic acid, and
  (2) a glycol comprising at least 75 mole percent 1,4-cyclohexanedimethanol,
(B) from about 2 to about 28 parts by weight, based on the weight of the composition, of a cellulose ester wherein the cellulose ester contains acetate and butyrate groups, the cellulose ester has a butyryl content of at least 15 percent by weight of said cellulose ester, an acetyl content of from about 0.5 percent to about 34 percent by weight of said cellulose ester, a hydroxy content of from about 0.1 percent to about 5 percent by weight of the cellulose ester and a viscosity of from about 0.1 to about 30, and
(C) a plasticizer having plasticizing properties in conjunction with the cellulose ester and the polyester.

According to a further aspect of our invention, there is provided a composition wherein the plasticizer (C) is an ester of an organic acid and an alcohol and is in the range of about 2 to about 20 parts by weight, based on the weight of the composition.

According to a further aspect of this invention, the linear polyester is poly(1,4-cyclohexanedimethylene)—35 to 55 mole percent terephthalate—65 to 45 mole percent isophthalate.

According to this invention, plasticizing component (C) functions to assist in providing for ready flowability of the material within acceptable temperature ranges such as 375° F. to 500° F. Such a plasticizer should of course be compatible with the components of the composition. Illustrative of suitable plasticizers are, for example, di-2-ethylhexyl phthalate prepared by reacting phthalic acid with di - 2 - ethylhexyl alcohol, di(2-ethylhexyl) isophthalate, di(2-ethylhexyl) azelate, didecyl phthalate, dibutyl phthalate, triphenyl phosphate, tricresyl phthalate, dibutyl sebacate, dioctyl adipate, and butylbenzyl phthalate. Other plasticizers suitable for use in this invention include low molecular weight polyesters having a molecular weight in the range of 1,000–3,000. One particularly suitable polyester is poly (1,4-cyclohexylenedimethylene terephthalate/isophthalate). Still other suitable plasticizers include mellitates such as trioctyl mellitate and benzoates such as glycerol in benzoate.

According to a still further aspect of our invention, there is provided a composition comprising components (A), (B), (C) and optionally also (D) from about 0.01 to about 1 percent, based on the weight of the linear polyester, of a stabilizer for the linear polyester which functions to prevent degradation of the polyester and thereby prevent darkening or other adverse color change of the composition as a whole. The stabilizer compound dilauryl 3,3'-thiodipropionate has been found to be satisfactory. Another suitable stabilizer is tris(3,5-di-tertiary butyl - 4 - hydroxy benzyl) - 5 - triazine - 2,4,6- (1H, 3H, 5H) trione. Still another suitable stabilizer includes dioctadecyl - 3,5 - di-t-butyl - 4 - hydroxy benzyl phosphate. The employment of the stabilizer thus provides a means of obtaining color uniformity in coatings produced from our novel compositions under widely varying fusion temperatures. Mixtures of stabilizers can be used in this invention.

According to still another aspect of our invention, the composition can include from about 0.1 to about 30 weight percent, based on the weight of the composition, of a pigment, a dye or a combination thereof, to give the composition any desired color and hiding or covering power.

According to one specific aspect of this invention, there is provided a composition comprising:

(A) a linear polyester having an inherent viscosity of at least about 0.4 derived from
  (1) a dicarboxylic acid comprising about 40 mole percent terephthalic acid and about 60 mole percent isophthalic acid, and
  (2) a glycol comprising 1,4-cyclohexanedimethanol,
(B) about 4 weight percent, based on the weight of the linear polyester, of a cellulose ester wherein the cellulose ester contains acetate and butyrate groups, the cellulose ester has a butyryl content of about 50 percent by weight of the cellulose ester, an acetyl content of about 1.5–2.0 percent by weight of the cellulose ester, a hydroxy content of from about 0.1 to about 5 percent by weight of the cellulose ester and a viscosity of about 0.2,
(C) about 10 weight percent, based on the weight of the linear polyester, of a plasticizer comprising di-2-ethylhexyl phthalate,
(D) about 0.2 to about 1 weight percent, based on the weight of the linear polyester, of a stabilizer selected from the group consisting of dilauryl 3,3' - thiodipropionate, tris(3,5-ditertiary butyl - 4 - hydroxy benzyl)- 5 - triazine - 2,4,6 - (1H, 3H, 5H) trione, dioctadecyl-3,5 - ditertiary butyl - 4 - hydroxy benzyl phosphate, and mixtures thereof, and
(E) about 0.1 to about 30 weight percent, based on the weight of the composition, of a pigment.

In this application the viscosity of the cellulose ester (B) component is determined by ASTM Procedure Designation D–817.

In this application the inherent viscosity of the linear polyester is measured at 25° C. using 0.23 gram of polymer per 100 ml. of a solvent composed of 60 volumes of phenol and 40 volumes of tetrachloroethane.

Reference will now be made to typical procedural steps by which a powdered, non-cratering, heat-fusible polyester containing composition may be prepared in accordance with our invention. The composition will always contain components (A), (B) and (C) in weight percentages falling within the ranges indicated above and may optionally and preferably contain predetermined and selected weight percentages of components (D) and (E) falling within the ranges of these components indicated above. The selected components are then homogenized on a two-roll hot mill or extruded, from which the homogenized material is solidified by cooling, and cut into pellets of approximately ⅛-inch size. These pellets are then pulverized in a grinder to a powder having an average particle size ranging from about 30 to about 200 microns.

Powdered compositions prepared as described above may be employed in accordance with our invention to produce fused coatings on the surfaces of any "heatable" substrate. By the term heatable substrate we refer to any substrate material which can withstand a temperature within the range of about 375° F. to about 500 F°. without deforming, charring and the like. Examples of such heatable substrates are those composed of steel, copper, aluminum and other metals, glass, ceramics, thermosetting resins such as phenolics, urea-formaldehyde and urea-melamine resins, thermosetting plastics such as thermosetting polyesters and crystalline linear polyesters such as polyethylene terephthalate, and the like.

The powdered composition may be deposited on the substrate by use of a powder gun, by electrostatic deposition or by deposition from a fluidized bed or by other well known methods of powder deposition. After deposition the powder is heated to a temperature sufficient to cause its particles to flow and thus fuse together to form a smooth, uniform, continuous, uncratered adhesive coating on the substrate surface. Since the polyester powder compositions of our invention are amorphous materials, they have no sharp melting point but may be caused to flow within a practical temperature range of 375° F. to 500° F., a preferred temperature for most applications being about 425° F.

The following examples are included for a better understanding of our invention:

EXAMPLE 1

A powdered, heat-fusible polyester coating composition is prepared by adding 95 parts by weight of a pelletized linear polyester prepared in accordance with the process disclosed in U.S. Patent 2,901,466, having an inherent viscosity of 0.6 and composed of 75 mole percent 1,4-cyclohexanedimethanol and 50 mole percent terephthalic acid and 50 mole percent isophthalic acid; 5 parts by weight of cellulose acetate butyrate in powder form and having a butyryl content of 51% by weight, an acetyl content of 1% by weight, hydroxyl content of 1.5–2% by weight (based on the weight of the cellulose acetate butyrate), a viscosity of 0.2, as determined by ASTM D–817–62T "A" falling ball; 10 parts by weight of di-2-ethylhexyl phthalate; and 0.5 part by weight dilauryl 3,3'-thiodipropionate are homogenized on a two-roll hot mill and withdrawn in sheet form, solidified by cooling, cut into ⅛-inch pellets and finally ground in an attrition mill to a powder having an average particle size of 70 microns. A number of 3-inch by 6-inch 0.037 gauge steel panels are thoroughly cleaned and the powdered polyester composition is deposited thereon electrostatically to a depth of about 100 microns. The panels are then heated for 10 minutes at a temperature of 425° F., which causes the powdered particles to flow and coalesce into a coating of excellent appearance. Visual examination of the coated panels show the coated surfaces to be smooth, uncratered and to display only slight orange peel effect. When the coated panels are subjected to the impact test described by Gardner and Sward in Physical and Chemical Examination, Paints·Varnishes·Lacquers·Colors, twelfth edition, page 146, 1962, the coating is found in each case to have an impact strength greater than 40 inch-pounds.

EXAMPLE 2

A polyester powder mixture is prepared as described in Example 1, except that 90 parts by weight of the polyester component and 10 parts by weight of cellulose acetate butyrate are employed. The powder is applied by electrostatic deposition to clean steel 3 x 6 inch panels to a thickness of .50 micron and heated for 9 minutes at 425° F. Examination of the resulting fused coating reveals a smooth, uncrated film having excellent adhesion to the metal surface, good mar resistance and a high degree of toughness and flexibility.

EXAMPLE 3

A powdered polyester composition containing no cellulose acetate butyrate component is prepared by the general procedure described in Example 1 and applied to 3 x 6 inch 0.037 gauge steel panels by electrostatic deposition. The panels are then heated to a temperature of 425° F. for 8 minutes to produce a fused polyester coating thereon of 125 microns. Examination of the coating reveals numerous small craters, irregular surface and general unevenness of the coating. Because of poor appearance due to cratering, such a coating is commercially unacceptable. Thus by comparison, this example illustrates the criticality of the use of the cellulose acetate butyrate component of the compositions of our invention.

EXAMPLE 4

A heat-fusible polyester powder coating composition is prepared in accordance with the general procedure of Example 1, except that 90 parts by weight of the linear polyester, 5 parts by weight of the cellulose ester, 10 parts by weight of di-2-ethylhexyl phthalate, 0.5 part by weight dilauryl 3,3'-thiodipropionate, and 10 parts by weight of a polyester condensation product of bisphenol A-diacetate and terephthalic and isophthalic acids containing 100 mole percent bisphenol A-diacetate, 65 mole percent terephthalic acid and 35 mole percent isophthalic acid is employed in compounding the composition. A powder composed of this material is deposited on 3 x 6 inch clean 0.037 gauge steel panels by electrostatic deposition to a depth of 100 microns. When the deposited material is heated for a period of 10 minutes at a temperature of 425° F., the particles are found to flow, coalesce and form a smooth, continuous coating on each panel. When the coated panels are subjected to the test described in Example 1, the coatings are found to have excellent substrate adherence, impact strength, toughness, flexibility, mar resistance and to be completely uncratered and otherwise free from surface defects. Such panels are immersed in water for 14 days, removed and examined. In attempting to strip the coating from the panel with a sharp knife, it is found that the coating firmly adheres to it even after the 14 day immersion in water.

EXAMPLE 5

The exact procedure of Example 1 is followed except the dilauryl 3,3'-thiodipropionate is omitted. While the resulting coating is smooth, uncratered and displays only slight orange peel effect, it is degraded and discolored.

EXAMPLE 6

Using the procedure of Example 1, a polyester formulation comprising 100 parts by weight of poly(1,4-cyclohexanedimethylene—60 mole percent isophthalate/40 mole percent terephthalate) I.V. 0.63, 10 parts of di-2-ethylhexyl phthalate, 5 parts of the cellulose acetate butyrate of Example 1, 0.5 part of dilauryl-3,3'-thiodipropionate, 0.5 part of di-n-octadecyl-3,5-di-t-butyl-4-hydroxybenzyl phosphonate and 2.5 parts of titanium dioxide was compounded and ground. Following electrostatic deposition and fusion of the powder at 400° F. for 10 min., the coatings had a smooth uncratered appearance with only slight orange peel.

EXAMPLE 7

A polyester powder formulation was prepared as in Example 1 except that poly(1,4-cyclohexanedimethylene—60 mole percent isophthalate/40 mole percent terephthalate) I.V. 0.77, instead of 0.63, was employed. The fused coating had a smooth uncratered appearance with only slight orange peel.

EXAMPLE 8

A polyester formulation comprising 100 parts by weight of poly(1,4-cyclohexanedimethylene—80 mole percent isophthalate/20 mole percent terephthalate) I.V. 0.71, 10 parts of di-2-ethylhexyl phthalate, 7 parts of the cellulose acetate butyrate of Example 1, 0.5 part of dilauryl-3,3'-thiodipropionate, 0.5 part of di-n-octadecyl-3,5-di-t-butyl-4-hydroxybenzyl phosphonate and 2.5 parts of titanium dioxide was compounded and ground. Following electrostatic deposition and fusion of the powder at 350° F. for 10 min., the coatings had a smooth noncratered appearance with only slight orange peel.

EXAMPLE 9

A powdered polyester formulation comprising 100 parts by weight of poly(1,4-cyclohexanedimethylene isophthalate) I.V. 0.58, 10 parts of di-2-ethylhexyl phthalate, 7 parts of the cellulose acetate butyrate of Example 1, 0.5 part of dilauryl-3,3'-thiodipropionate, 0.5 part of di-n-octadecyl-3,5-di-t-butyl-4-hydroxybenzyl phosphonate and 2.5 parts of titanium dioxide was compounded and ground. Following electrostatic deposition and fusion of the powder at 350° F. for 10 minutes, the coatings had a smooth non-cratered appearance with only slight orange peel.

It will be evident from the foregoing description and examples that the present invention provides a simple and effective means of coating a wide variety of metal, glass, ceramic, heat-hardening plastic and other substrates by the employment of heat-fusible polyester powder compositions at relatively low application temperatures (e.g., 375° F.). The coatings are strongly adherent to the substrate surface, tough, flexible, have high impact strength and they are free from cratering and other surface defects. The polyester coating powders of our invention are particularly advantageous in that no primer coat is required in order to obtain adequate adhesion of the composition to the surface to be coated. Such compositions are also susceptible to ready application to any surface by means of standard powder coating techniques as, for example, gun spraying, electrostatic deposition and deposition by the fluidized bed method. Many other advantages will be apparent to those skilled in the art.

Although the invention has been described in considerable detail with reference to certain preferred embodiments thereof, it will be understood that variations and modifications can be effected without departing from the spirit and scope of the invention as described hereinabove.

We claim:
1. A composition comprising:
   (A) from about 72 to about 98 parts by weight, based on the weight of the composition, of a linear polyester having an inherent viscosity of at least about 0.4 measured at 25° C. using 0.23 gram of polymer per 100 ml. of a solvent composed of 60 volumes of phenol and 40 volumes of tetrachloroethane, the linear polyester being derived from
      (1) a dicarboxylic acid comprising 0–55 mole percent terephthalic acid and 100–45 mole percent isophthalic acid, and
      (2) a glycol comprising at least 75 mole percent 1,4-cyclohexanedimethanol,
   (B) from about 2 to about 28 parts by weight, based on the weight of the composition, of a cellulose ester wherein the cellulose ester contains acetate and butyrate groups, the cellulose ester has a butyryl content of at least 15 percent by weight of said cellulose ester, an acetyl content of from about 0.5 percent to about 34 percent by weight of said cellulose ester, a hydroxy content of from about 0.1 percent to about .5 percent by weight of the cellulose ester and a viscosity of from about 0.1 to about 30 determined by ASTM Procedure Designation D–817, and (C) from about 2 to about 20 parts by weight, based on the weight of the composition, of a plasticizer having plasticizing properties in conjunction with the cellulose ester and the polyester.

2. The composition of claim 1 wherein the plasticizer is an ester of an organic acid and an alcohol.

3. Composition of claim 1 also comprising
(D) from about 0.01 to about 1 percent, based on the weight of the linear polyester, of a stabilizer for the linear polyester.

4. The composition of claim 1
wherein the linear polyester is poly(1,4-cyclohexanedimethylene)—35 to 55 mole percent terephthalate—65 to 45 mole percent isophthalate,
also comprising from about 0.01 to about 1 percent, based on the weight of the linear polyester, of a stabilizer for the linear polyester.

5. Composition of claim 4 wherein the plasticizer is di-2-ethylhexyl phthalate.

6. Composition according to claim 4 wherein the stabilizer comprises dilauryl 3,3'-thiodipropionate.

7. Composition according to claim 4 wherein the stabilizer comprises tris(3,5-ditertiary butyl-4-hydroxy benzyl)-5-triazine-2,4,6-(1H, 3H, 5H) trione.

8. Composition according to claim 4 wherein the stabilizer comprises dioctadecyl - 3,5 - ditertiary butyl-4-hydroxy benzyl phosphate.

9. A composition comprising:
(A) a linear polyester having an inherent viscosity of at least about 0.4 measured at 25° C. using 0.23 gram of polymer per 100 ml. of a solvent composed of 60 volumes of phenol and 40 volumes of tetrachloroethane, the linear polyester being derived from
(1) a dicarboxylic acid comprising about 40 mole percent terephthalic acid and about 60 mole percent isophthalic acid, and
(2) a glycol comprising 1,4-cyclohexanedimethanol;

(B) about 4 weight percent, based on the weight of the linear polyester, of a cellulose ester wherein the cellulose ester contains acetate and butyrate groups, the cellulose ester has a butyryl content of about 50 percent by weight of the cellulose ester, an acetyl content of about 1.5–2.0 percent by weight of the cellulose ester, a hydroxy content of from about 0.1 to about 5 percent by weight of the cellulose ester and a viscosity of about 0.2 determined by ASTM Procedure Designation D–817;

(C) about 10 weight percent, based on the weight of the linear polyester, of a plasticizer comprising di-2-ethylhexyl phthalate;

(D) about 0.2 to about 1 weight percent, based on the weight of the linear polyester, of a stabilizer selected from the group consisting of dilauryl 3,3'-thiodipropionate, tris(3,5-ditertiary butyl-4-hydroxy benzyl)-5-triazine-2,4,6-(1H, 3H, 5H) trione, dioctadecyl-3,5-ditertiary butyl-4-hydroxy benzyl phosphate, and mixtures thereof; and (E) about 0.1 to about 30 weight percent, based on the weight of the composition, of a pigment.

References Cited
UNITED STATES PATENTS
3,654,198  4/1972  Hood et al. _____ 260—16

WILLIAM H. SHORT, Primary Examiner
E. WOODBERRY, Assistant Examiner

U.S. Cl. X.R.
117—124 E, 132 B, 138.8 A, 161 C; 260—31.2 XA